Jan. 12, 1954

H. D. STEVENS ET AL 2,665,757

AUTOMATIC MEASURING AND CUTTING PLY FEEDER

Filed Jan. 7, 1949

Inventors
Horace D. Stevens
and
Herbert H Waters

By

Attorneys

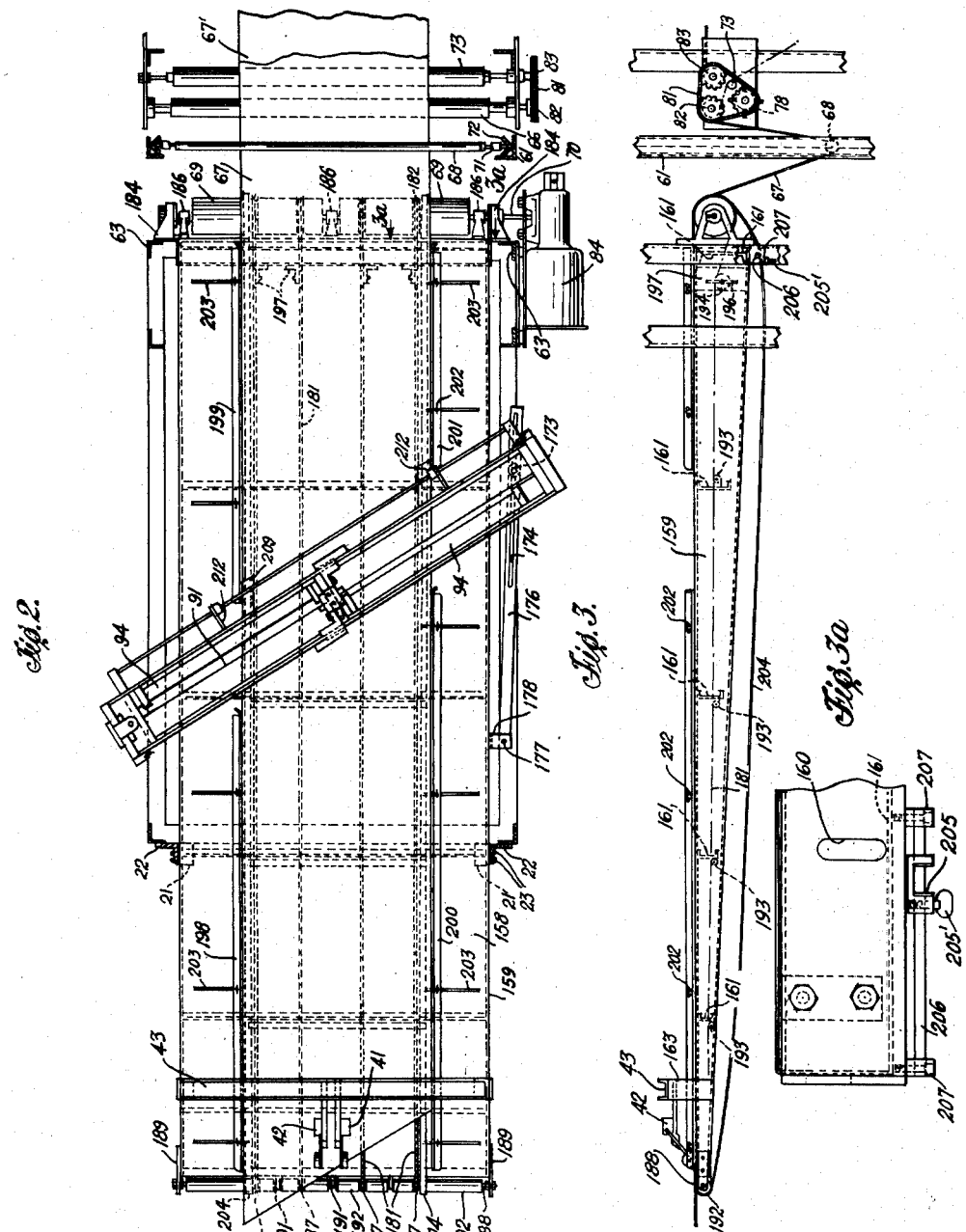

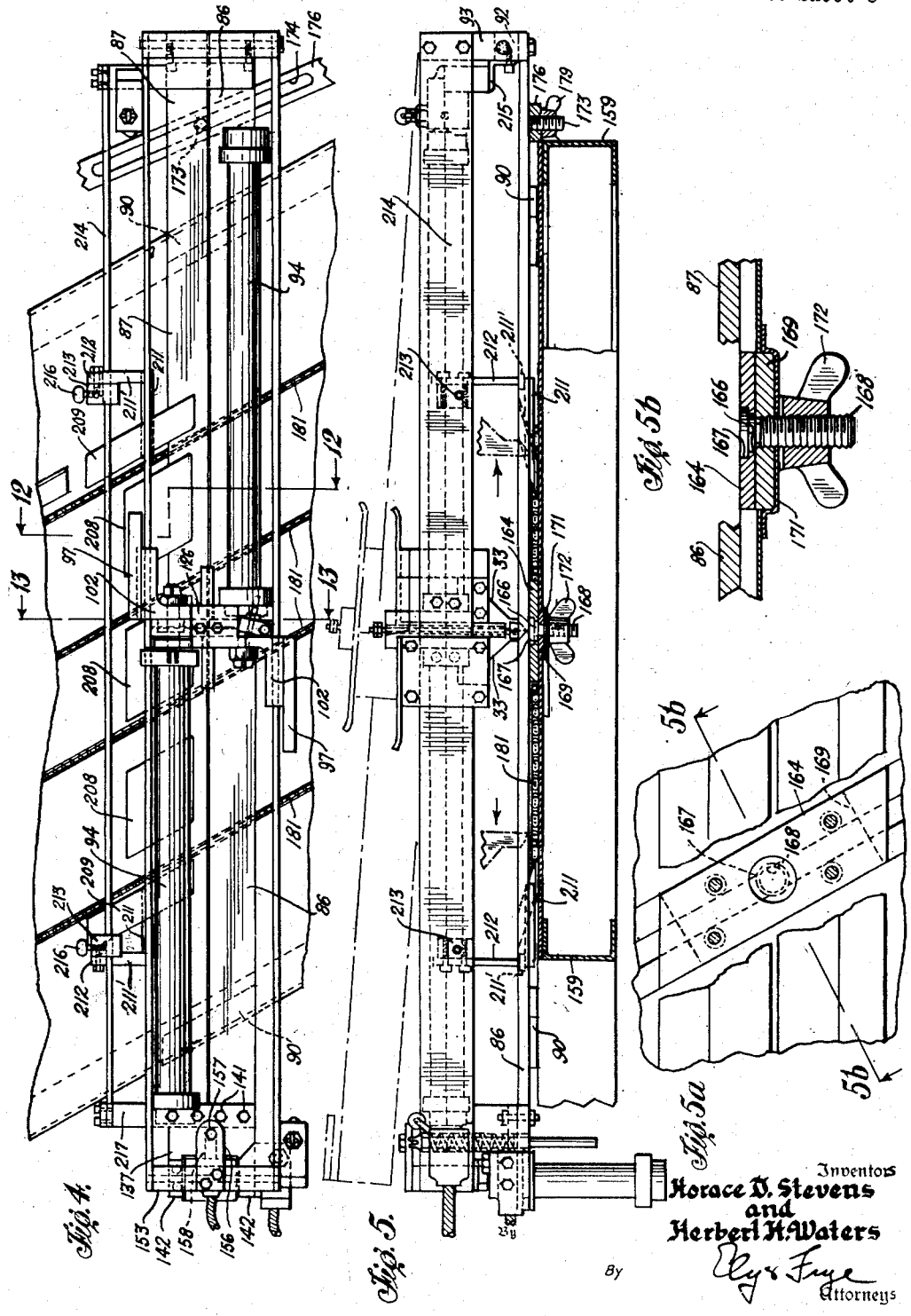

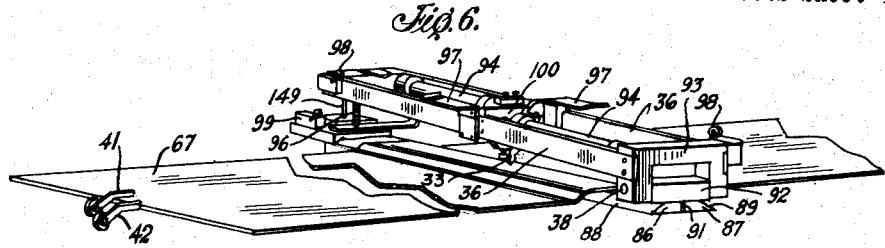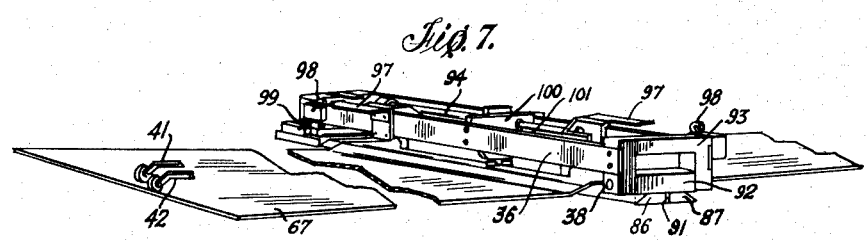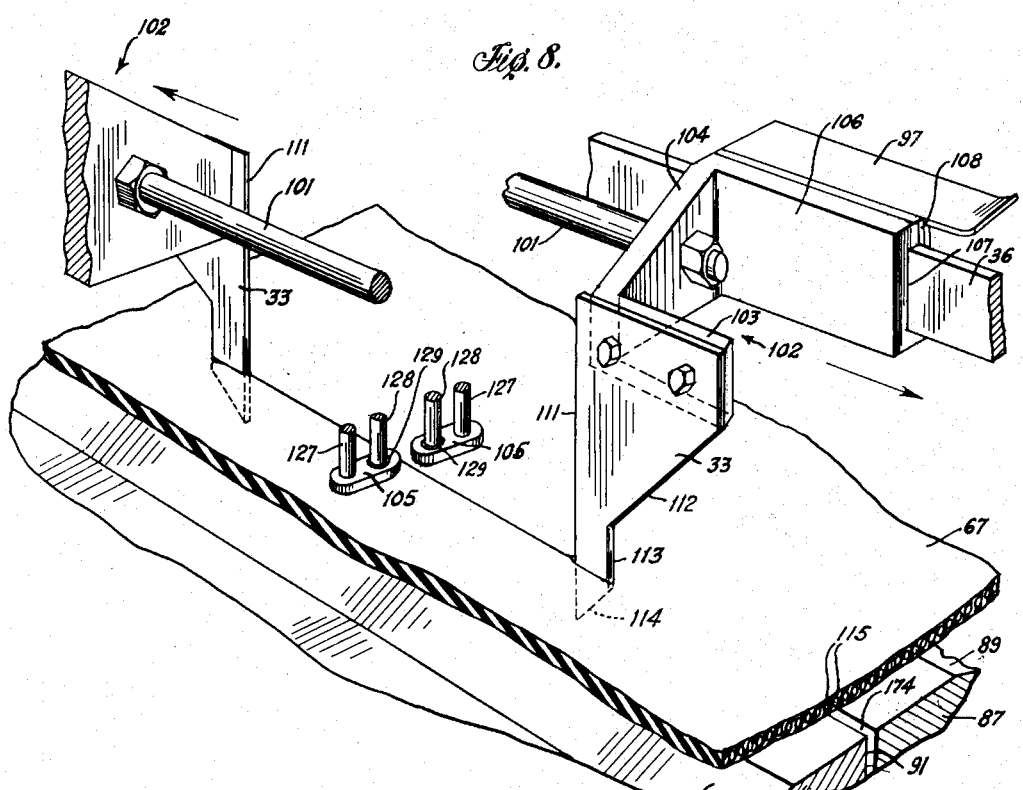

Jan. 12, 1954    H. D. STEVENS ET AL    2,665,757
AUTOMATIC MEASURING AND CUTTING PLY FEEDER
Filed Jan. 7, 1949    7 Sheets-Sheet 5

INVENTORS
Horace D. Stevens
and
Herbert H. Waters
BY
ATTORNEYS

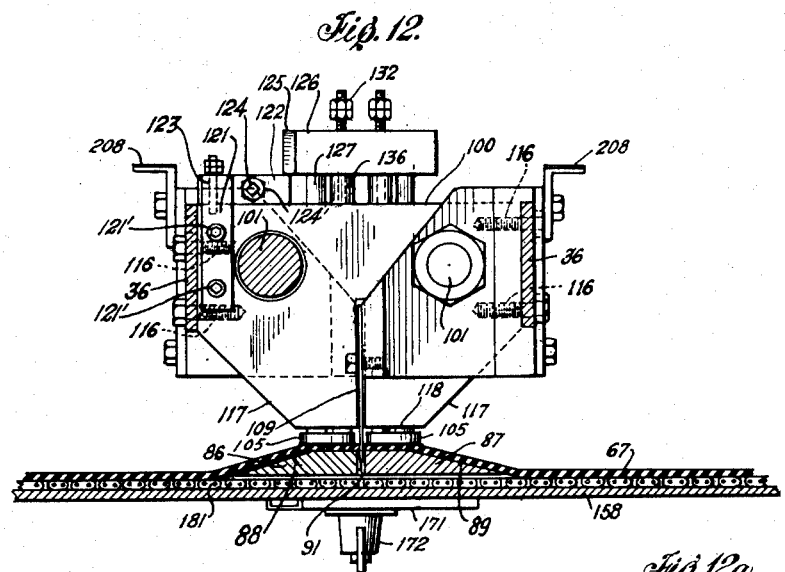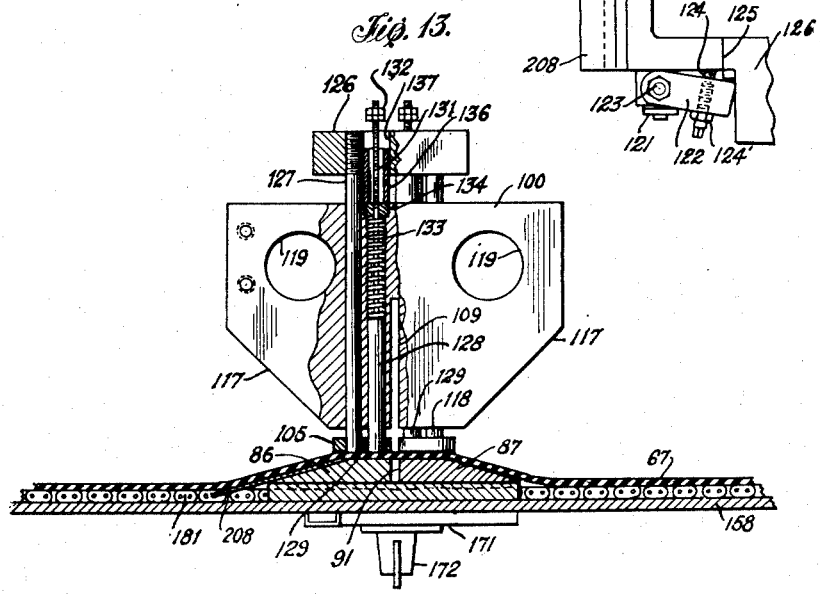

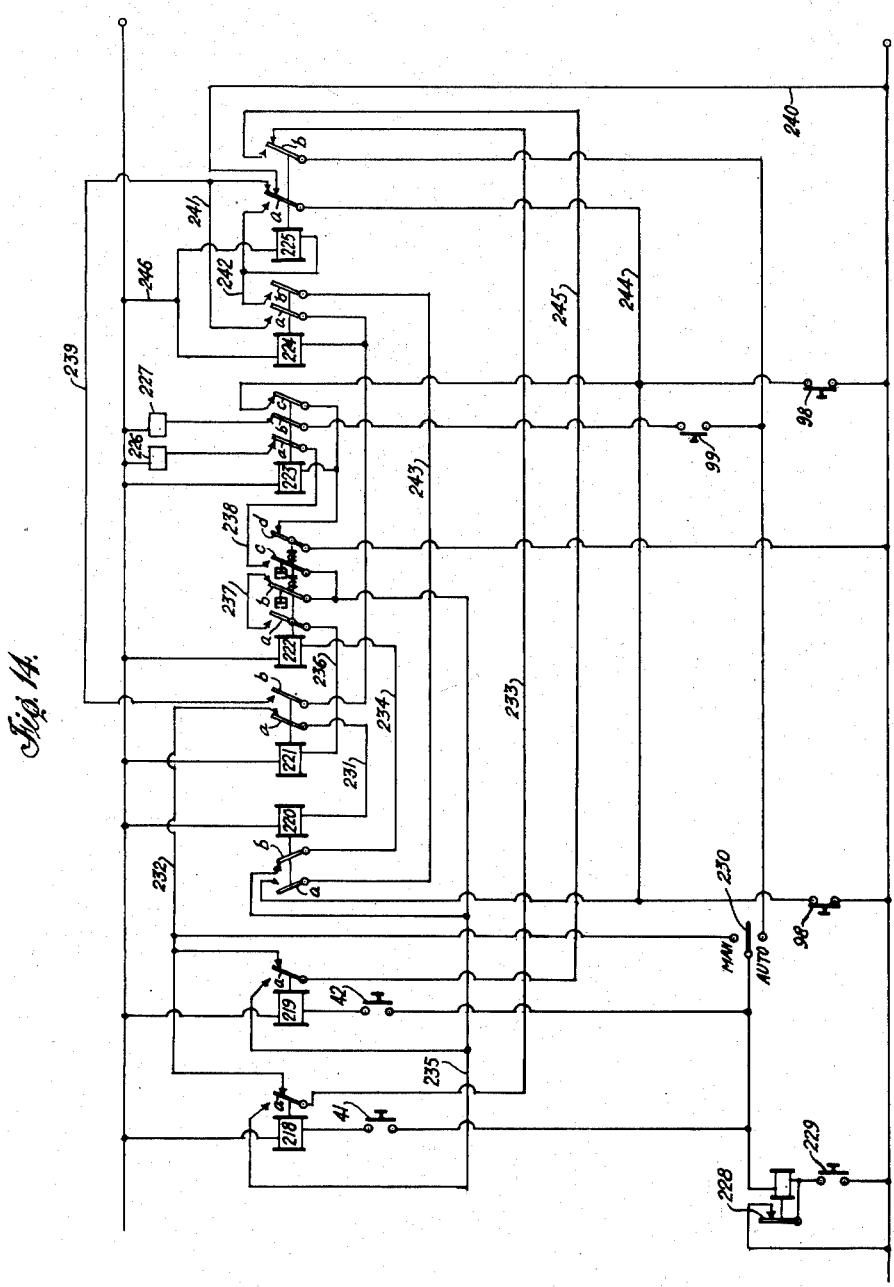

Patented Jan. 12, 1954

2,665,757

UNITED STATES PATENT OFFICE 2,665,757

AUTOMATIC MEASURING AND CUTTING PLY FEEDER

Horace D. Stevens and Herbert H. Waters, Akron, Ohio, assignors to The Firestone Tire & Rubber Company, Akron, Ohio, a corporation of Ohio Application January 7, 1949, Serial No. 69,704

1 Claim. (Cl. 164—75)

This invention relates to a machine which may conveniently be used in connection with a tire-building machine, and which facilitates the supply of ply lengths of rubberized cord fabric for the tire-building process by feeding ply material as desired and automatically measuring and cutting ply sections in the exact lengths required for each step of the tire-building operation and with the appropriate orientation of cords within the plys. While the machine and method herein described are primarily intended for cutting strips of cross-cut cord tire fabric into lengths suitable for tire building, it may have other utilities as well.

Heretofore the preparation of ply-lengths has constituted a serious factor in the delays incident to tire-building since prior methods have involved manual attention on the part of the operator to attain the necessary lengths. For instance, it has been customary to furnish the operator with two rolls of ply sheet having, respectively, oppositely disposed cord angles. From these rolls the operator tears off the estimated ply length required, applies it to the tire-building drum and then tears off the excess length. This results not only in lost time but considerable waste of material.

In attempts to achieve automatic ply-cutting, the obstacles have chiefly been found in the difficulty of attaining sequentially varying lengths and in providing alternating cord angles. It has been found also that separation by means of a sharp-edged knife leaves much to be desired in that, unless it were exactly aligned in the cord direction and the sheet firmly held in flat condition, there is likelihood of a non-linear cut, with the knife even cutting through the cords. Furthermore, a sweep of a single knife from one edge to the other of the sheet is uncertain in operation and not conducive to accurate linear slitting since there is a tendency to pull the sheet as a whole in the direction of motion of the knife, and the initial tear requires a sharp knife edge presented laterally to an edge of the ply. All of the above difficulties are overcome by the method and machine of this invention wherein a pair of knives pierce the sheet centrally and then diverge to slit the sheet with dull edges. A pair of trays are provided to accommodate sheets of opposite cord angles and cutting to length in sequence is provided for by limit switches arranged in a novel manner and operating in a novel arrangement of circuits.

It is therefore an object of the invention to make possible completely automatic measuring and cutting of ply sections, a further object being to provide a machine in which ply sections are cut in cycles involving a sequence of increasing lengths, and especially wherein the length sequence involves sections having alternate directions of cord angle. It is also an object to provide an improved method and means for the slitting operation itself.

These and other ends, which will be in part apparent and in part made manifest as the description proceeds, are attained by the invention, a preferred embodiment of which is described in the accompanying specification and illustrated in the drawings, in which.

Fig. 2 is a top plan view of the upper ply-conveyor tray and knife carriage,

Fig. 3 is a side view of Fig. 2, with the drive motor and its mounting removed,

Fig. 3a is a view taken on the line 3a—3a of Fig. 3,

Figure 9:
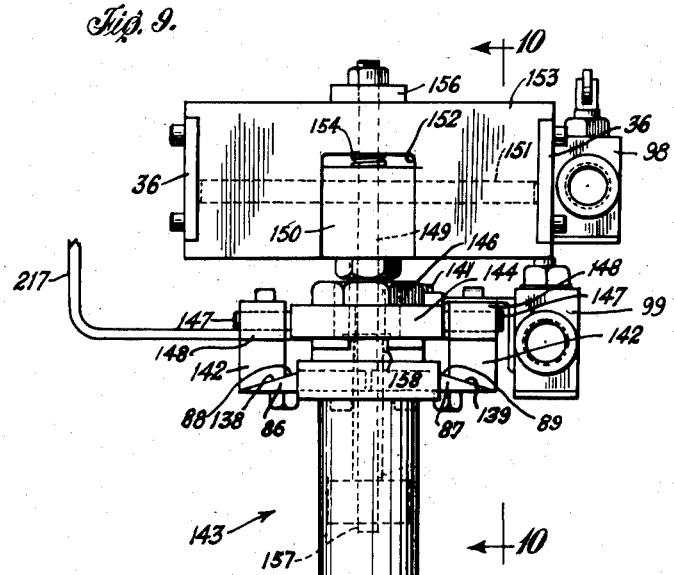
Figure 10:
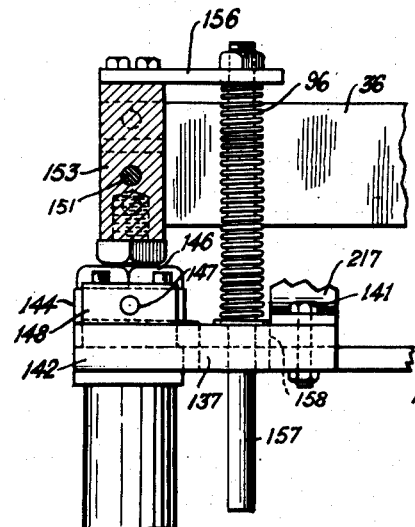
Figure 11:
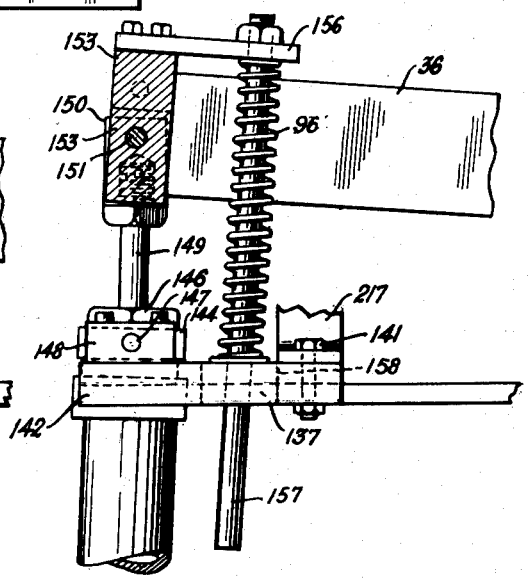

Fig. 4 is a plan view of the knife assembly, enlarged, showing a portion of the tray, Fig. 5 is a front elevation of Fig. 4, Fig. 5a is an enlarged detail of elements on the tray, centrally of the knife carriage, Fig. 5b is a section taken on the line 5b—5b of Fig. 5a, Fig. 6 is a perspective of the knife assembly in upwardly swung position, prior to cutting, Fig. 7 is a view similar to Fig. 6 with the knife carriage lowered and the knives in the process of separating the ply section, Fig. 8 is an enlarged fragmentary view in perspective of the knives, Fig. 9 is an enlarged end view of the knife carriage from the swinging end thereof, the leftward end as viewed in Fig. 6, Fig. 10 is a section on the line 10—10 of Fig. 9, Fig. 11 is a view similar to Fig. 9 showing the knife carriage swung upwardly, Fig. 12 is an enlarged section taken on the line 12—12 of Fig. 5, Fig. 12a is a top plan fragmentary view of the left end of Fig. 12, Fig. 13 is an enlarged section taken on the line 13—13 of Fig. 5, and Fig. 14 is a wiring diagram of the electric controls.

General description

Figure 1:
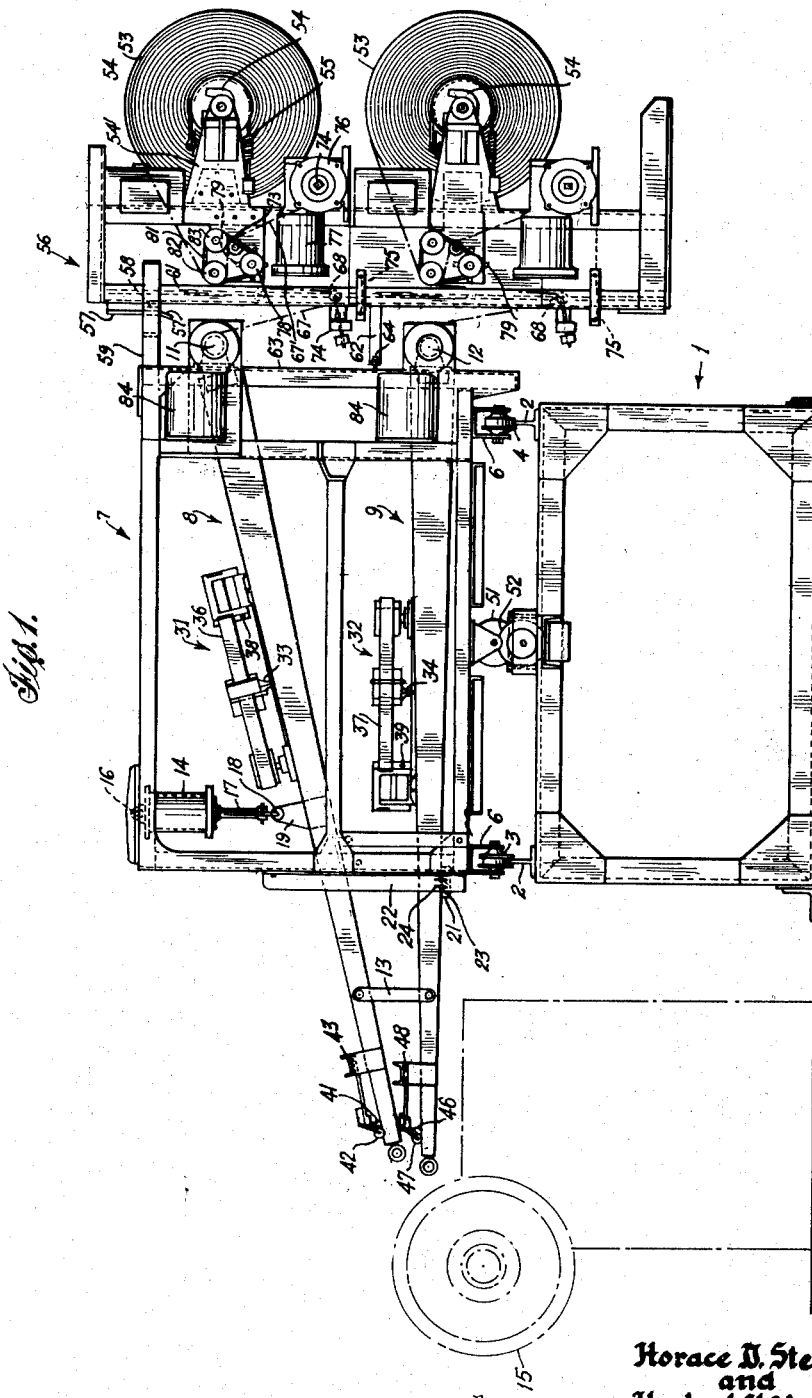
Fig. 1 is a side view of the assembled machine.

Referring to Fig. 1, there is shown generally at 1, a base frame having a pair of rails 2 on which are supported the entire ply-handling apparatus for rolling movement into and out of alignment with a tire-building drum 15, by means of a suitable number of flanged wheels such as 3 and 4. The wheels are journaled in fork members 6 attached to a central, main frame or cage, indicated generally by the numeral 7, to the rear of which upper and lower tray assemblies 8 and 9, respectively, are pivoted on axes 11 and 12. Two tray assemblies are provided in each frame 7 to furnish alternate diagonals of cord in successive ply lengths. While only one frame 7 is shown, it will be understood that two or more may be provided in the case where more ply lengths are required in the building of a tire or where the plys employed are of different widths. The tray assemblies are joined together near their front ends by means of a freely pivoted pair of links 13 which maintains their relative positions at all times in the semblance of an acute angle with the delivery (leftward) ends of the tray members relatively close together. It will be seen that axes 11, 12 and the pivots of links 13 define a quadrilateral swingable about the pair of fixed points 11, 12. The provision for upward swing of the pair of trays is for the purpose of affording clearance at the tire-building drum 15 for feeding operations to the drum of materials other than the plys, by mechanism not shown in this application. The rotation is effected by a lifting device comprising an air cylinder 14 pivoted to the main cage 7 as at 16, having a piston rod 17 with its lower end engaging centrally of a cross bar 18, which in turn is pivoted at each end to a bracket 19 bolted to the sides of the tray 8. An adjustable lower stop for the tray assemblies is provided at each side of the lower tray by a block 21 carried by an angle bar 22 fixed to the front of frame 7. Each block is secured to an angle bar 22 by screws 23 and the block is vertically adjustable by means of vertical slots 24 in the angle bar 22.

Knife units 31, 32 carried, respectively, by tray assemblies 8, 9 are located for sliding motion of the knives along a line directed angularly to the longitudinal extent of the trays and parallel to the cord direction of the ply, this direction being reversed as between the upper and lower tray assemblies, as will be clear from the orientation of knife units 31, 32, respectively, in Fig. 1. The knives, shown in back-to-back pairs at 33, 34, are movable in opposed directions to and from the center or other intermediate point of the ply sheet along rails 36, 37. The knife units, as a whole, are swingable upward about pivots 38, 39 on the near ends of the units so as to clear the sheet on return of the knives to center.

Upper tray 8 carries near its end adjacent the tire-building drum 15, a pair of limit switches 41, 42 carried by a channel 43 athwart the tray, the two switches being staggered longitudinally of the tray so as to stop the ply sheet in positions for ply lengths of increasing value alternately, as will be made apparent in greater detail hereinafter. Lower tray 9 has a similar pair of switches 46, 47 carried by channel 48.

The entire cage 7 is movable along the tracks 2 by means of a pair of air cylinders 51, 52 arranged in tandem in a known manner to move the assembly away from the tire-building drum or to align any of a group of separate vertical banks of pairs of trays, when a plurality of such banks is employed.

A supply unit designed to hold a vertical bank of two rolls 53 of liner-covered ply material is indicated generally at 56. The rolls are supported in hooks 54 of brackets 54' and the roll shafts are provided with brakes 55. The entire unit is separate from the cage 7 and is supported thereon by hooks 57 engaging over crosspieces 58 carried between double parallel walls of rearwardly extending brackets 59 at the top of cage 7, the outer wall being flared at its end to provide a ready guide for the upright members 61 of unit 56 in hooking the latter in place. The horizontal thrust of the unit 56 against the cage 7 is taken by bars 62 acting against uprights 63 of cage 7 and having adjusting screws 64.

Since the mechanism of supply rolls 53 and their respective tray assemblies is identical in each case, only one set need be described. From the upper roll 53 the combined ply and liner sheet passes over a roll 66 (see Fig. 2) and there divides, the ply 67 passing under a compensator roller 68 and thence over a coaxial set of roller segments 69 on a shaft 70 journaled in the tray frame 8. The main drive for urging the ply sheets along the trays is furnished by motors 84 carried by the framework of cage 7 and driving the shaft 70 of the series of aligned rolls 69 and a chain conveyor, as will appear. The shaft of the compensating roller carries at its ends a pair of skates 71 guided for vertical movement in an angle bar 72 fixed to the inner side of the upright 61. The shaft of compensating roller 68, which roller may also be described as a feeder control, regulates the output from supply roll 53 as demanded by feed along the tray caused by motor 84 in a manner well understood in the art. With motor 84 at rest, the shaft of roller 68 rests on the lever of a switch 74 to close the same and motor 77 is deenergized. When motor 84 is running the feed of the ply along the tray tends to take up the slack at roller 68, the latter is lifted, motor 77 starts and material is fed from roll 53. This lowers roll 68 to operate switch 74 and motor 77 stops. The action is thus intermittent. Since there will be some tendency of the supply roll 53 to coast after motor 84 is stopped, a pan 75, extending between uprights 61, serves to receive the ply material which drops from the compensator roller 68.

The liner material 67' after separating from the ply material at roller 66 is led over a roller 73 and wound onto a roll driven by the shaft 74 of the reduction gear 76 of the motor 77. A "kick" roll 78 with vanes 79 is provided to prevent any tendency of the ply material to follow the liner by adherence thereto. The "kick" roll is driven by a chain 81 engaging a sprocket wheel 82 keyed to the shaft of the roller 66 and chain tightening is provided for in an adjustable sprocket wheel 83.

*The knife assembly*

For details of the knife assembly, reference is had to Figs. 4 to 13, the structural features being generalized in Figs. 6 and 7. A pair of plates 86, 87, with oppositely disposed, slanted edge surfaces 88, 89, respectively, provide a base for the knife assembly. These plates are mutually attached by plates 90 (Fig. 5) in a manner to provide a clearance 91 which functions as a slideway for the knives in the ply-slitting operation, and are mounted for adjustment both longitudinally and angularly of the tray, as will be later pointed out herein. Anchorage for the knife carriage is provided in a block 92 fixed at one end of the ramp plates and carrying the pivot 38 on which is swivelled a forked block 93 to which the ends of the rails 36 are attached as by bolts. The knife elements 33 are moved to and from a location intermediate the width of the ply sheet by means of two oppositely acting air cylinders 94 attachd to the respective rails 36, and the knife carriage is swung upwards about pivot 38 by means of a helical spring 96 at the end of an outward movement of the knives, to strip the ply from the knives and to provide clearance for feed of the next length of ply. The outward limit of motion of the knives is determined by contacts 97 movable with the knives and engaging with limit switches 98 which cause stoppage of the knives and initiate lifting of the carriage and return of the knives to original position intermediate the sheet. A limit switch 99 so controls cylinders 94 as to cause outward movement of the knives on descent of the knife carriage and inward movement on rise of the knife carriage. A central block 100, bolted between the rails 36, serves to house the ply stripping mechanism and, additionally, lends rigidity to the rails 36 and provides a center support for the piston rods 101 of the air cylinders 94.

The knife supports are shown in detail in Fig. 8. In this view the stripper block 100 is omitted except for the pressure feet thereof, 105. The knives 33 are bolted to blocks shown generally at 102. These blocks are identical in the case of each knife except for a transposition of parts to provide for right and left hand installations. Each knife is bolted to an arm 103 which is joined, through a tapering web 104, to a wider and longer arm 106, parallel to arm 103 and having a rectangular slot 107 snugly receiving the rail 36 for sliding motion therealong, the arm 106 being held in place on the rail by a cap plate 108 to which the limit switch actuating member 97 is attached. It will be noted that the knife 33 extends somewhat inwardly of the arm 103 in order that contact may be made with the inner edge of its companion knife within a slot 109 in the stripper block 100 (see Figs. 12 and 13). The knives have a straight inner edge 111 and are tapered as at 112 to a vertical edge 113 and from thence taper as at 114 to a point. The edge 114 is sharpened and is intended to effect initial penetration of the ply sheet by cutting; thereafter the edge 113, which is blunt, effects separation of the ply section from the main sheet by a tearing action in the rubber between a pair of cords 115.

The stripper block and the general relation of the knives thereto are shown in Fig. 12, and the stripper mechanism is detailed in Fig. 13. The stripper block comprises a plate bolted as at 116 to rails 36, and with sides 117 tapering inwardly from the bottom of the rails to a narrow bottom edge 118. The block has circular openings 119 on each side of center to accommodate piston rods 101 of the air cylinders 94 for sliding motion. A latch 122, carried on top of the block 100, is arranged for swinging motion horizontally on a pivot 123 threadedly secured in the top of the block 100. The latch is urged to a position in substantial alignment with the top edge of the block 100 by means of a leaf spring 121 secured to the block by screws 121'. The latch 122 threadedly carries a screw 124 which extends from one side to the other of the latch and is locked in adjusted position by a nut 124'. Under the urging of the spring, the latch is engageable under an extension 125 on one end of a block 126 located at the top of the stripper mechanism, but is removable therefrom against the pressure of spring 121 when the screw 124 is contacted by the leftward knife block 102 (Fig. 4) when the knives are in the position centrally of the knife frame. The shouldered portion 125' defined by extension 125 is wider at the bottom than at the top so as to give a quick, snap-like action when the latch is removed from under the extension.

An identical stripper mechanism is located on each side of the center line of block 100. Referring to Fig. 13, it will be seen that the block 126 is movable up and down with respect to the stripper housing block 100 by virtue of a long bolt 127 threaded in the block 126, slidable in a bore in the block 100, and which fixedly carries at its lower end the pressure foot 105. A second rod 128 is slidable in the block 100 and through an opening 129 in the presser foot 105. Rod 128 has its major upper portion reduced in diameter, as at 131, and has a pair of adjusting and locking nuts 132 threaded on its upper end. The rod 128 is pressed downwardly by a helical spring 133 surrounding its reduced portion 131 and contained between the shoulder on the rod and a nipple 134 threaded in the upper end of the opening in block 100. A spacer tube 136 is freely slidable on a reduced portion 131 above nipple 134 in an opening 137 in block 126.

The operation of the stripper mechanism is as follows: As the knife block moves away from screw 124, the latch 122 moves under the block 126 under pressure of spring 121. When the knife carriage is swung upwardly at the outer limit of the knife stroke the latch lifts the freely suspended system comprising block 126, rod 127 and presser foot 105. However, due to the urging of spring 133, the rod 128 remains in contact with ply material 67 and prevents it from rising with the knife carriage due to possible adherence to presser foot 105. Spacer 136 is carried upwardly by nipple 134 and, when it reaches nut 132, rod 128 is lifted. When the knife is returned to center, with the knife carriage still in upswung position, the knife removes latch 122 from under block 126, permitting the latter and its fixed parts to fall of their own weight to cause presser foot 105 to remove ply material from rod 128 in case it has adhered thereto.

Details of the mechanism for raising and lowering the knife carriage are shown in Figs. 9, 10, and 11. A forked member 137 has its underside slanted as at 138 and 139 to mate with the slanted sides 88, 89 of plates 86, 87, respectively. The base of the forked member is bolted as at 141 to the plates 86, 87 and its tines 142 extend to the end of the plates and surround the upper end of the knife-carriage-lowering air cylinder assembly shown generally at 143. The latter carries a cap plate 144 secured by a large nut 146, the plate having a pair of opposed shafts 147 trunnioned in blocks 148 bolted to the tops of tines 142, whereby the air cylinder is tiltable about the axis of shafts 147. The piston rod 149 of the air cylinder is studded into a block 150 which is located in a slot 152 in a cross head 153 bolted to the ends of rails 36, this block 150 being swivelled upon a shaft 151, located in the cross head 153 and extending across the slot 152. In the upward swing of the rails 36, air cylinder 143 turns on pivot 147 and block 150 turns on shaft 151 as shown in Fig. 11. The raising of the knife carriage is occasioned by the helical spring 96 engaging between the top surface of forked member 137 and a plate 156 bolted to the top of block 153, the spring being reinforced by a central rod 157 attached to the plate 156 and reciprocable in a slot 158 (see Fig. 4) in the base of the forked member 137.

The tray

The entire knife carriage assembly is supported (Figs. 2 to 5) on a long tray 158 having downturned side flanges 159 tapering from a shallow, front portion to a wide, rear portion, the tray structure being reinforced by cross channel braces 161. The channel 43 spaced above the tray, as by upright straps 163 secured to the sides of the tray, serves to support the limit switches 41, 42, the contact rollers of which dwell upon the upper tray surface and are actuated when lifted by the ply sheet advancing along the tray.

The knife carriage assembly is attached to the tray in a manner to permit longitudinal and angular adjustment as follows: Bolted centrally of the knife-guide plates 86, 87 is a joining member 164, generally similar to plates 90, which serves as a rotating anchor means for the guide plates and as a connection with a means for locking the knife carriage in adjusted longitudinal position. The plate 164 has a lower central bore 166 and an upper counterbore 167 receiving the stepped head of a bolt 168. The latter is screw-threaded in a central bore in a plate 169 fitted in a trough 171 having a central slot to permit passage of the bolt lengthwise of the trough. It will be seen that pressure applied by means of the wing nut 172 clamps the slide plate 169 to the bottom of trough 171 by virtue of the threaded engagement of the bolt therewith, but leaves plate 164, and hence the entire knife carriage, free to rotate about the head of bolt 168. It will be noted that plates 90 and plate 164 serve to space the plates 86, 87 above the tray. The knife carriage is fixed in desired angular position by means of a bolt 173 studded in the underside of guide plate 87 and engaging in a slot 174 (Fig. 2) in a guide rod 176 pivoted as at 177 to a bracket 178 attached to the side flange of tray 158, the bolt 173 being fixed at the desired angular position by means of a wing nut 179. In this arrangement the bolts 168, 173 and the pivot 177 define a triangle which ensures rigidity of the knife carriage in angular position, and the bolt 168 further ensures fixation of the carriage in a given position longitudinally of the tray.

The spacing of the knife guide plates 86, 87 above the tray by plates 90 and plate 164 provides clearance for a parallel series of four endless chains each indicated by the numeral 181 which serve to convey the ply sheet along the tray. The chains are driven by sprocket wheels 182 driven by the shaft 183 of motor 84, the shaft being supported in brackets 184 attached to uprights 63 on the cage 7, and also supported in a series of brackets 186 attached to the rear side of the tray framework. At the front end of the tray, the chains pass over sprocket wheels 187 carried on a shaft 188 journaled in brackets 189 on the sides of the tray. Shaft 188 is also supported intermediately by brackets 191 on the front edge of the tray and carries roller segments 192. The returning, lower sides of the chains are supported on rollers 193 and tension-adjusting rollers 194 adjustable in vertical slots 196 in angle plates 197 fixed to the rearmost cross-bracing channel 161. Suitable openings 160 in channel members 161 provide for passage of the chains therethrough.

Angle-bar guide members 198, 199, 200, 201 are fixable in various positions laterally of the tray 158 by means of bolts with wing nuts 202 and slots 203 transversely of the tray, and the respective aligned pairs of guide members are spaced longitudinally to provide clearance for swing of the knife carriage about central pivot 168.

In order to prevent fold-under and other malfunctioning of the leading corners of the ply sheet, adjutable conveyors are provided to carry the side edges of a sheet of any width by means of endless tapes 204 trained over the end segments of rollers 69 and 192 in a manner free for adjustment of the rolls so as to be positionable at or near the ply guides 198–201. As shown in Fig. 3a, a guide means is provided to maintain each tape 204 in position laterally of the tray. This comprises a fork-shaped rider 205 slidable on a rod 206 which is supported in a pair of brackets 207 fastened to the underside of the tray. The tape slides around the rod 206 and is held in position by the two ends of the rider, the latter being locked in adjusted position by means of a thumb screw 205'.

In the feeding of ply sheet onto plate 87 of the knife assembly, the vertical spacing of the plate above the tray 158 presents an obstacle to feeding of the sheet. To provide certainty in the feeding of the sheet, therefore, guide ramps 208 (Fig. 4) are fixed to the slant face of plate 87 in any convenient manner. These will preferably have a lozenge form to provide edges parallel to the cut edge of the sheet and edges parallel to the direction of travel of the sheet. The angles of these plates may constitute a mean value between the expected limits of angular adjustment of the knife carriage. Outwardly of the three guide ramps shown, a pair of laterally movable ramps 209 is provided for adjustable positioning at the edges of a sheet with the ramp supports outward of the sheet. Each of these ramps is fixed on its underside to a foot 211 aligned with the knife carriage, and which has a right-angled extension 211' on the end of which is mounted an upright 212 at the top of which a rider 213 is screw-fastened. The rider has a slot in its underside by means of which it is slidable along a rail 214 and is lockable in position by a thumb screw 216. The rail 214 is screw-fastened to L-shaped supports 217, the feet of this support at the swingable end of the carriage being secured to plate 87 in a common fastening, by bolts 141, with the forked member 137 (Fig. 10), and at the other end to a bracket 215 carried by pivot block 92 (Fig. 5).

General description of operation

In the building of a tire, four-ply for instance, each ply section must be slightly longer than the preceding section to allow for increasing diameter of the tire during the building process. Likewise, each succeeding ply wrapped onto the tire must have its cords angularly disposed with respect to the preceding ply. To this end, the upper and lower trays, together with their respective associated knife assemblies, etc., operate alternately. At the end of any cycle of automatic operation, the machine is at rest with the knife carriage in upwardly swung position, and each tray bears between the knife carriage and one of their pairs of limit switches 41, 42 and 46, 47 a ply section cut to proper length. Removal of one of the ply sections operates, through the lifting of the said one of the limit switches, to start the ply sheet feeding along the tray and the liner winding on its roll. The ply sheet advances until it meets the other of the pair of limit switches to define a ply section of greater or less length than the preceding section, as the case may be, and the motors are stopped and the supply roll braked to a stop. The knife carriage then swings donward piercing the sheet at its center with the pair of knives in back-to-back contact and clamping the sheet with the presser feet of the stripper.

Descent of the knife carriages operates a switch which causes the knives to recede from the center, separating the ply sheet along a line between an adjacent pair of cords. At the outward limit of travel of the knives, the latter operate a limit switch which shuts off pressure to cylinder 143 and permits spring 96 to swing the knife carriage upwardly, and the knives return to back-to-back position centrally of the carriage. This completes the cycle for a single tray, a repetition of the foregoing automatic operations being initiable by the mere act of removal of the cut ply sections.

However, since alternate cord angles are desired, the operator will take the next ply section from the other tray. The ply-length setting of limit switches 41, 42, 46, 47 will therefore be predicated on this shaft from tray to tray; for instance, succeeding lengths will be determined by a cycle of operation triggered by limit switches 41, 46, 42, 47, in that order.

Detailed description of electric controls

The foregoing brief description of automatic and cyclic operation will now be detailed in connection with the wiring diagram shown in Fig. 14. In this connection, a description for a single tray will be sufficient since the operation is identical in the case of each.

In the figure, the automatic controls comprise a series of interconnecting circuits involving a series of switch units indicated by the reference characters 218 to 225, inclusive. Each of these switch units, shown as relays, is connectable across the main line either directly or through one or more of the others and each controls one or more switches. Units 218 and 219 are associated with ply-length determining limit switches 41 and 42, respectively. While these are shown in the diagram as simple switches, it will be understood that much more sensitive controls will be required. Functionally, however, the switches serve to energize units 218 and 219, and they are thus shown. The unit 220 is associated with the conveyor motor, and starts the same when energized. Unit 221, when energized, brakes the supply roll to a stop. Unit 222 serves to set the knife operations in motion with the assistance of unit 223, and units 224 and 225 function in the ply-length alternations in conjunction with units 218, 219.

The control for lowering the knife carriage to clamping position (by air cylinder 143) is indicated by 226, and that for causing recession of the knives (by air cylinders 94) by 227. Limit switches 98 for outward limit of knife movement and limit switch 99 for outward movement of the knives are indicated by their proper reference characters in the wiring diagram.

The switches associated with the respective relays 218 to 225 will be indicated by small letters reading from left to right, each to be identified with the reference character of its relay.

A self-sealing switch 228 is operated by a push button 229 and serves to energize the control circuit. Unit 223 is energized independently of the control circuit through closed switch 222d and is sealed in through switch 223c and thus is sustained only during the closed condition of limit switches 98. Switch 230 is thrown to close contact in "automatic" position.

With no ply material contacting limit switch 41, unit 218 is de-energized and motor unit 220 is energized through line 231, switch 221a, line 232, switch 218a, line 233, and switch 225b. When the ply sheet reaches switch 41, unit 218 is energized, the contact with line 232 is broken and the motor stops. The stopping of the motor restores the contact 220b and energizes unit 222 through line 234, switch 220b, line 235, switch 218a, and line 233. Unit 221 is therefore energized through line 236 and a transient circuit line 237 contacting an instant closing switch 222a and a delayed opening switch 222b, line 235, switch 218a, line 233, and switch 225b, and the supply roll is braked to a stop. Unit 226 is then energized to drop the knife carriage, through switch 223a, line 238, a delayed closing contact 222c, line 235, etc. Upon full descent of the knife carriage limit switch 99 energizes unit 227 through switch 223b to cause the knives to move in opposite directions from an intermediate point between the edges of the sheet. At the limit of such outward movement, limit switches 98 are contacted to open, and 223, no longer energized through 222d, is de-energized; switches 223 a, b, and c open, 226 and 227 are de-energized, the knife carriage is raised by pressure of spring 96 and the knives return to a central position.

The machine is now at rest with 219 still de-energized, 222 still energized, and with 224, which was energized in the closing of switch 221b through line 239, switch 225a, and line 240, sealed in through switch 224a and lines 241 and 240. It should be noted that 225 did not energize in this cycle for the reason that switch 224b closed only after the opening of switch 220a.

Upon removal of the cut ply from the tray, unit 218 is de-energized, and 220 energized to start the motor in the same manner as before. Unit 222 is de-energized by the opening of switch 220b and 223 is again energized and sealed in, as before.

In this second cycle, unit 224 being energized, unit 225 is energized through line 242, switch 224b, line 243 and switch 220a and seals in through switch 225a and line 244. At the same time unit 224 is de-energized both at 225a and 221b in readiness for the repetition of the first cycle.

Subsequent automatic operations are the same as in the first cycle, the circuits to switch 225b leading through 219a instead of 218a, and proceeding through a line 245. In the second cycle the ply sheet proceeds to switch 42 before stopping the motor because the circuit to line 233 is open at 225b.

A "short" cut may be made in any cycle as desired by opening the line 246, as by a push button normally closed. This will cut out 224 and 225 and leave switch 225b closing the circuits to line 233. A "long" cut may be made at any time by connecting 224 across the line which can also be accomplished by a push button, normally open. Energization of 224 will in each case lead to sealing in of 225 during operation of the motor and thus direct the circuits at 225b into line 245.

While a preferred embodiment of the invention has been shown, it will be apparent that changes may be made in such details as the size, shape, arrangement and character of the various elements and, therefore, the invention should not be considered as limited except as shall appear from the spirit and scope of the appended claim.

What is claimed is:

In a machine for cutting sheet material on the bias, in combination, a fixed tray, means for delivering sheet material along the tray, a knife carriage supported on the tray and having a knife arranged for movement angularly to the longitudinal extent of the tray, a pair of limit switches engageable by the sheet material to stop the sheet delivering means and said switches located at different distances from said knife carriage, and means to render said switches operative alternately.

HORACE D. STEVENS.
HERBERT H. WATERS.

References Cited in the file of this patent

UNITED STATES PATENTS

| Number | Name | Date |
|---|---|---|
| 1,407,712 | Stevens et al. | Feb. 28, 1922 |
| 1,435,979 | Reed | Nov. 21, 1922 |
| 1,469,757 | Sibley | Oct. 2, 1923 |
| 1,484,728 | Lund | Feb. 26, 1924 |
| 1,546,934 | Levin | July 21, 1925 |
| 1,585,012 | Biersdorf | May 18, 1926 |
| 1,859,785 | Messinger | May 24, 1932 |
| 1,938,787 | Abbott | Dec. 12, 1933 |
| 2,071,097 | Wennberg et al. | Feb. 16, 1937 |
| 2,203,884 | Stone | June 11, 1940 |
| 2,323,770 | Hazelton | July 6, 1943 |
| 2,387,650 | Davis | Oct. 23, 1945 |
| 2,423,698 | Hallman | July 8, 1947 |

FOREIGN PATENTS

| Number | Country | Date |
|---|---|---|
| 25,421 | Great Britain | Nov. 25, 1908 |